United States Patent
Spampinato et al.

(10) Patent No.: US 12,542,502 B2
(45) Date of Patent: Feb. 3, 2026

(54) SYSTEM AND METHOD FOR INDIRECTLY MEASURING AN ANGULAR POSITION AND/OR ROTATIONAL SPEED OF A WOUND-ROTOR MOTOR

(71) Applicant: STMICROELECTRONICS INTERNATIONAL N.V., Geneva (CH)

(72) Inventors: Andrea Spampinato, Mascalucia (IT); Sebastiano Yuri Ciardo, Mascalucia (IT); Gianluigi Forte, Camporotondo Etneo (IT)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 189 days.

(21) Appl. No.: 18/431,014

(22) Filed: Feb. 2, 2024

(65) Prior Publication Data

US 2025/0253789 A1    Aug. 7, 2025

(51) Int. Cl.
 *H02P 1/46* (2006.01)
 *H02P 21/18* (2016.01)
 *H02P 21/22* (2016.01)

(52) U.S. Cl.
 CPC ............. *H02P 21/18* (2016.02); *H02P 21/22* (2016.02)

(58) Field of Classification Search
 CPC .. H02P 21/18; H02P 2203/05; H02P 2203/11; H02P 23/14; H02P 9/009; H02P 29/666; H02P 25/089
 See application file for complete search history.

(56) References Cited

U.S. PATENT DOCUMENTS

| 9,539,914 | B2 * | 1/2017 | Klatt ...................... B60L 3/106 |
| 2009/0012742 | A1 | 1/2009 | Eldery et al. |
| 2016/0308423 | A1 | 10/2016 | Rozman et al. |

(Continued)

OTHER PUBLICATIONS

Uzel et al., "Estimator comparison for Resolver Motivated Sensorless Rotor Position Estimation of Wound Rotor Synchronous Motors," 2014 16th European Conference on Power Electronics and Applications, 1-8, (Sep. 2014).

(Continued)

*Primary Examiner* — Karen Masih
(74) *Attorney, Agent, or Firm* — Alston & Bird LLP

(57) ABSTRACT

In accordance with various embodiments of the present disclosure, a system for indirectly measuring an angular position and/or a rotational speed of an electrical machine having a rotatable shaft, a wound rotor, and a stator having three or more phases is provided. In some embodiments, the system comprises a switching converter adapted to provide a current to the wound rotor that has a component detectable in the stator, current sensing circuitry adapted to detect a stator current, filtering circuitry adapted to extract the detectable component, and control circuitry for (i) transforming the extracted detectable component into two, 90 degree displaced currents, (ii) demodulating the two, 90 degree displaced currents to obtain an envelope waveform for each of the two, 90 degree displaced currents, and (iii) analyzing the envelope waveforms for the two, 90 degree displaced currents to determine an angular position and/or a rotational speed of the rotatable shaft.

19 Claims, 6 Drawing Sheets

(56) References Cited

U.S. PATENT DOCUMENTS

2022/0200493 A1  6/2022  Combes
2022/0255479 A1  8/2022  Yajurvedi et al.

OTHER PUBLICATIONS

Li et al., "Rotor Position Estimation Approaches for Sensorless Control of Permanent Magnet Traction Motor in Electric Vehicles: A Review. World Electric Vehicle Journal," 12(1):9. https://doi.org/10.3390/wevj12010009, (Jan. 2021).

Uzel et al., "Resolver Motivated Sensorless Rotor Position Estimation of Wound Rotor Synchronous Motors with Kalman Filter," IEEE, 978-1-4799-0224-8/13, (2013).

Deng et al., Rotor Position Detection of Synchronous Motor Based on High-frequency Signal Injection into the Rotor, 2011 Third International Conference on Measuring Technology and Mechatronics Automation, DOI: 10.1109/ICMTMA.2011.619, (Feb. 2011).

Choi et al., "Sensorless Control for Electrically Energized Synchronous Motor Based on Signal Injection to Field Winding," IEEE, 978-1-4799-0224-8/13, (2013).

Surroop et al., "Sensorless rotor position estimation by PWM-induced signal injection," 367-372. 10.1109/IECON43393.2020.9254909 (Oct. 2020).

\* cited by examiner

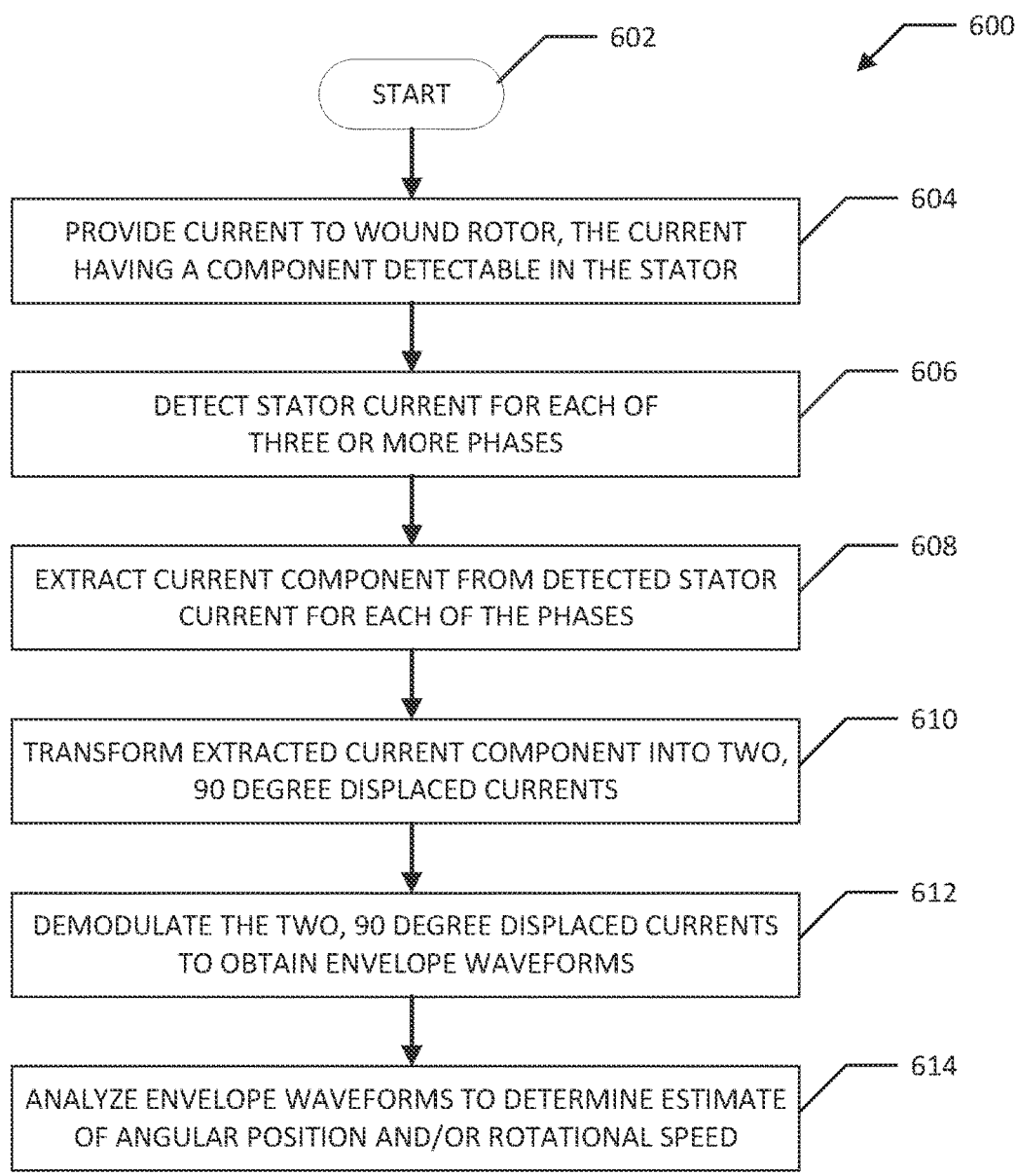

SYSTEM AND METHOD FOR INDIRECTLY MEASURING AN ANGULAR POSITION AND/OR ROTATIONAL SPEED OF A WOUND-ROTOR MOTOR

FIELD OF THE INVENTION

Example embodiments of the present disclosure relate generally to electrical machines, such as electric motors, generators, and alternators and, more particularly, to systems and methods for indirectly measuring the angular position and/or rotational speed of such electrical machines.

BACKGROUND

In electric motor control applications, it is often necessary to know the angular position and/or rotational speed of the motor's rotor. One approach that has been used to determine the angular position and/or rotational speed of a motor's rotor is to use a resolver coupled to the motor. A resolver is a device having a rotating winding that is excited with a high-frequency signal and two stationary windings positioned at 90 degrees to each other. Current flows through the rotating winding which induces current in the stationary, two-phase windings. The two-phase windings, being positioned at 90 degrees to each other, produce a sine and cosine feedback current. The relative magnitudes of the two-phase voltages are measured and used to determine the angle of the rotor relative to the stator. The angle phase can be computed using "arctangent" function, phase locked loops, or other known techniques.

Applicant has identified many technical challenges and difficulties associated with measuring the angular position and/or rotational speed of a motor. Through applied effort, ingenuity, and innovation, Applicant has solved problems related to measuring the angular position and/or rotational speed of a motor by developing solutions embodied in the present disclosure, which are described in detail below.

BRIEF SUMMARY

Various embodiments described herein related to systems and methods for indirectly measuring the angular position and/or rotational speed of electrical machines, such as electric motors, generators, and alternators.

In accordance with various embodiments of the present disclosure, a system for indirectly measuring an angular position and/or a rotational speed of an electrical machine having a rotatable shaft, a wound rotor, and a stator having three or more phases is provided. In some embodiments, the system comprises a switching converter adapted to provide a current to the wound rotor, the current having a component detectable in the stator, current sensing circuitry adapted to detect a stator current for each of the three or more phases, filtering circuitry adapted to extract the detectable component of the current provided to the wound rotor from the detected stator current for each of the three or more phases, and control circuitry for (i) transforming the extracted detectable component of the current provided to the wound rotor from the detected stator current for each of the three or more phases into two, 90 degree displaced currents, (ii) demodulating the two, 90 degree displaced currents to obtain an envelope waveform for each of the two, 90 degree displaced currents, and (iii) analyzing the envelope waveforms for the two, 90 degree displaced currents to determine an angular position and/or a rotational speed of the rotatable shaft.

In some embodiments, the detectable component of the current provided to the wound rotor comprises a ripple current of a switching current provided to the wound rotor.

In some embodiments, the detectable component of the current provided to the wound rotor comprises a sinusoidal signal having a lower frequency than a switching current provided to the wound rotor.

In some embodiments, the detectable component of the current provided to the wound rotor has a frequency that is adjustable and correlated to the rotational speed of the rotatable shaft.

In some embodiments, the filtering circuitry is adjustable to enable extraction of the detectable component of the current provided to the wound rotor having an adjustable frequency.

In some embodiments, the frequency of the detectable component of the current provided to the wound rotor is at least four times a frequency of the envelope waveforms for the two, 90 degree displaced currents.

In some embodiments, the control circuitry transforms the extracted detectable component of the current provided to the wound rotor from the detected stator current for each of the three or more phases into two, 90 degree displaced currents using a Clarke transformation.

In some embodiments, the control circuitry analyzes the envelope waveforms for the two, 90 degree displaced currents to determine an angle and/or rotational speed of the rotatable shaft using a phase locked loop or an arctangent function.

In some embodiments, the electrical machine comprises a motor, a generator, or an alternator.

In some embodiments, the electrical machine comprises an electrically excited synchronous motor.

In accordance with various embodiments of the present disclosure, a method for indirectly measuring an angular position and/or a rotational speed of an electrical machine having a rotatable shaft, a wound rotor, and a stator having three or more phases is provided. In some embodiments, the method comprises providing a current to the wound rotor, the current having a component detectable in the stator; detecting a stator current for each of the three or more phases; extracting the detectable component of the current provided to the wound rotor from the detected stator current for each of the three or more phases; transforming the extracted detectable component of the current provided to the wound rotor from the detected stator current for each of the three or more phases into two, 90 degree displaced currents; demodulating the two, 90 degree displaced currents to obtain an envelope waveform for each of the two, 90 degree displaced currents; and analyzing the envelope waveforms for the two, 90 degree displaced currents to determine an estimate of an angular position and/or a rotational speed of the rotatable shaft.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which:

FIG. 6 an example flow diagram illustrating an example method for indirectly measuring the angular position and/or rotational speed of an electrical machine having a wound rotor, in accordance with an example embodiment of the present disclosure.

DETAILED DESCRIPTION OF THE INVENTION

Figure 1:
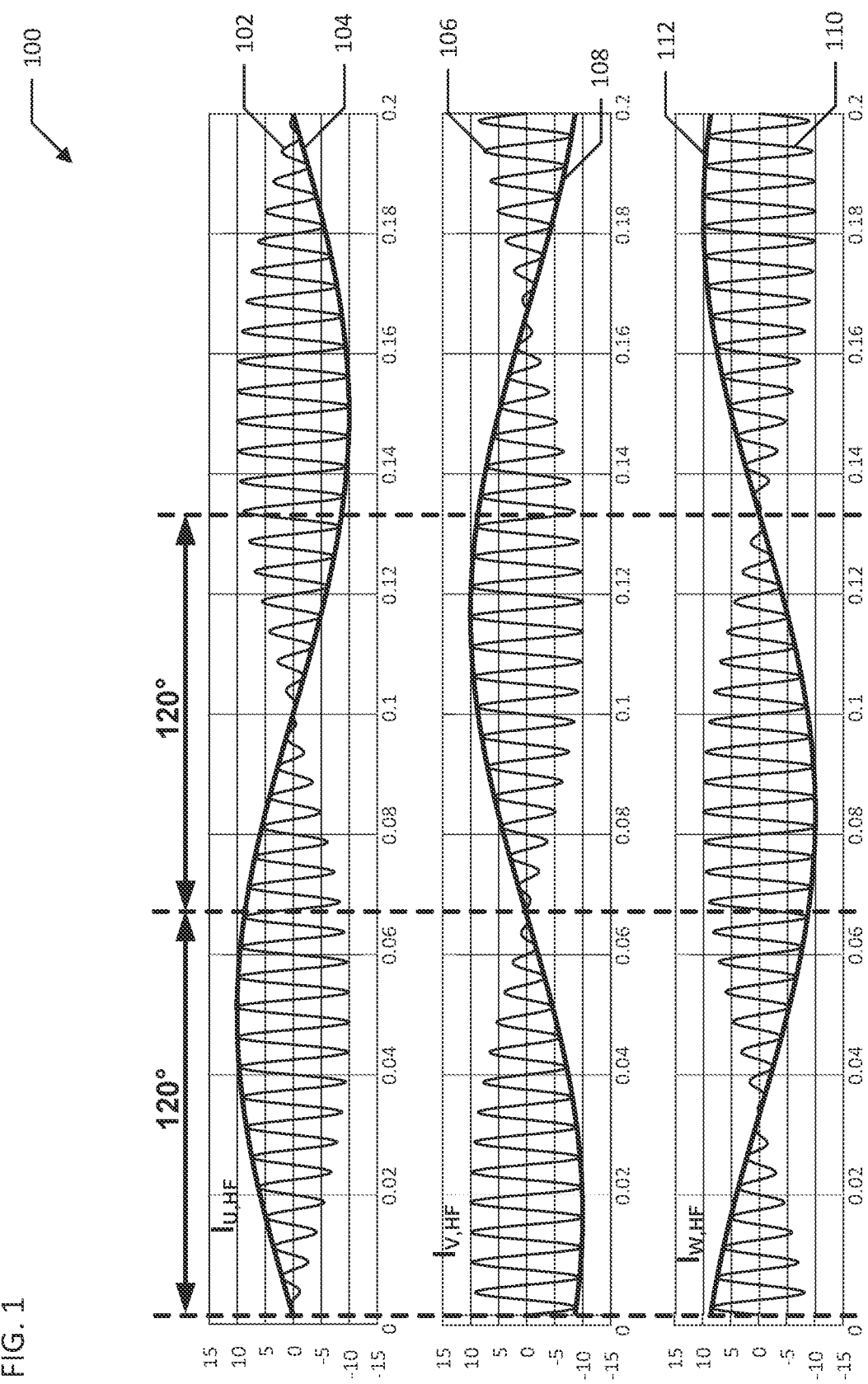
FIG. 1 illustrates example stator current waveforms of an example system for indirectly measuring the angular position and/or rotational speed of an electrical machine having a wound rotor, in accordance with some embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

Various embodiments of the present disclosure overcome the above technical challenges and difficulties and provide various technical improvements and advantages based on, for example, but not limited to, providing example systems and methods for indirectly measuring the angular position and/or rotational speed of an electrical machine having a wound rotor without using a resolver or other type of sensor. Various embodiments of the present disclosure provide example systems and methods for indirectly measuring the angular position and/or rotational speed of electrical machines such as a motors, generators, and alternators. For simplicity, embodiments of the present disclosure are described herein in relation to motors only, however, embodiments of the present disclosure can also be used for indirectly measuring the angular position and/or rotational speed of generators and alternators. In various embodiments, the accuracy of the indirect measurement of the angular position and/or rotational speed of an electrical machine depends mainly in the accuracy of the measurement of the currents, the interpolation method between the measurements, and the variability of the speed related to mechanical parameters of the machine. The indirect measurement of the angular position and/or rotational speed of an electrical machine of various embodiments of the present disclosure is sufficient to achieve the field oriented control of the machine in an equivalent way as with using a resolver.

Various embodiments of the present disclosure provide example systems and methods for indirectly measuring the angular position and/or rotational speed of three phase or multiphase (i.e., more than three phase) electric motors that have wound rotors (rather than permanent magnet rotors), such as but not limited to electrically excited synchronous motors (EESMs) and induction motors. Wound rotor motors (e.g., EESMs) have a dedicated rotor winding used to provide a constant magnetic field (like the permanent magnet does in permanent magnet synchronous motors) when supplied with DC current. For simplicity, embodiments of the present disclosure are described herein in relation to three-phase motors only, however, embodiments of the present disclosure can also be used for indirectly measuring the angular position and/or rotational speed of multiphase motors.

Various embodiments of the present disclosure enable the indirect measurement of the rotational position of the rotor at zero speed (standstill) and at low speed, enabling the use of advanced motor control algorithms to generate the nominal torque, without torque ripple.

Various embodiments of the present disclosure do not require detailed information about the motor model such as inductance curves and windings resistance, as may be required in other sensorless approaches that have been used.

Embodiments of the present disclosure involve injecting a periodic signal in the rotor winding introducing a small ripple in the field (i.e., rotor) current. The field current component will induce an effect on the stator windings which can therefore be extracted from the stator currents. In this regard, the rotor and stator of the wound motor itself functions somewhat like a resolver, but with windings that are displaced at 120° instead of 90°.

In various embodiments of the present disclosure, the position and speed information are contained in the high-frequency harmonic components of the stator current. As such, in various embodiments a high pass or bandpass filter is used to extract the high-frequency response from the stator current.

Various embodiments of the present disclosure inject a sinusoidal signal to the field winding to introduce a small ripple in the field current ($I_f$) that is high enough to generate the desired effect in the stator without introducing undesired torque ripple. In various embodiments, this is accomplished by ensuring that the switching frequency ($f_{SW}$) (i.e., the frequency of the signal provided (e.g., from a switching converter) to the rotor windings to induce the desired magnetic field) is sufficiently higher (e.g., at least about ten times higher) than the frequency of the injected signal ($f_{HFI}$). In some embodiments, for example, the frequency of the injected signal ($f_{HFI}$) is about 1.5-5 kilohertz (kHz) and the switching frequency ($f_{SW}$) is about 15-50 KHz.

In various embodiments, the injected signal should have a frequency that is several times (e.g., 5-10 times) greater than the rotational speed of the motor. In some embodiments, the frequency of the injected signal may be varied based on the speed of the motor (i.e., lower frequency at lower speeds and higher frequency at higher speeds). In such embodiments in which the frequency of the injected signal is varied based on the speed of the motor, an adjustable high pass or bandpass filter (e.g., a high pass or bandpass filter executed in software in which the passband frequency range may be adjusted as needed) is used to extract the high-frequency response from the stator current.

Various embodiments of the present disclosure may be implemented within, for example, a system or device for controlling an electric motor, commonly termed a drive system or a motor controller.

Referring now to FIG. 1, example stator current waveforms 100 of an example system for indirectly measuring the angular position and/or rotational speed of a motor having a wound rotor are illustrated. FIG. 1 shows example stator currents 102, 106, 110 (also labeled, respectively, $I_{U,HF}$, $I_{V,HF}$, $I_{W,HF}$) in which the high frequency components (i.e., the injected signal, which is at a higher frequency than the currents that are provided to the stator windings to cause the motor to rotate) have been extracted for all three phases of a three-phase motor. Because this is for a three-phase motor, the stator currents are offset 120 degrees from each other. In various embodiments, the example stator currents 102, 106, 110 are modulated according to the rotor position during rotation of the motor shaft. As seen in FIG. 1, the stator current for each phase has an envelope waveform 104, 108, 112 which contains information about rotor position and speed (in various embodiments, the envelope waveforms 104, 108, 112 are not obtained at this point, but are shown in FIG. 1 for explanation purposes).

In various embodiments, the extracted high frequency components of the three stator currents (if the motor is a three-phase motor) are transformed into two, 90-degree displaced currents using any suitable method or technique for such transformations, including but not limited to a Clarke transformation. In this regard, the extracted high frequency components may be used like the output of a resolver to determine the motor's angular position and/or rotational speed.

Figure 2:
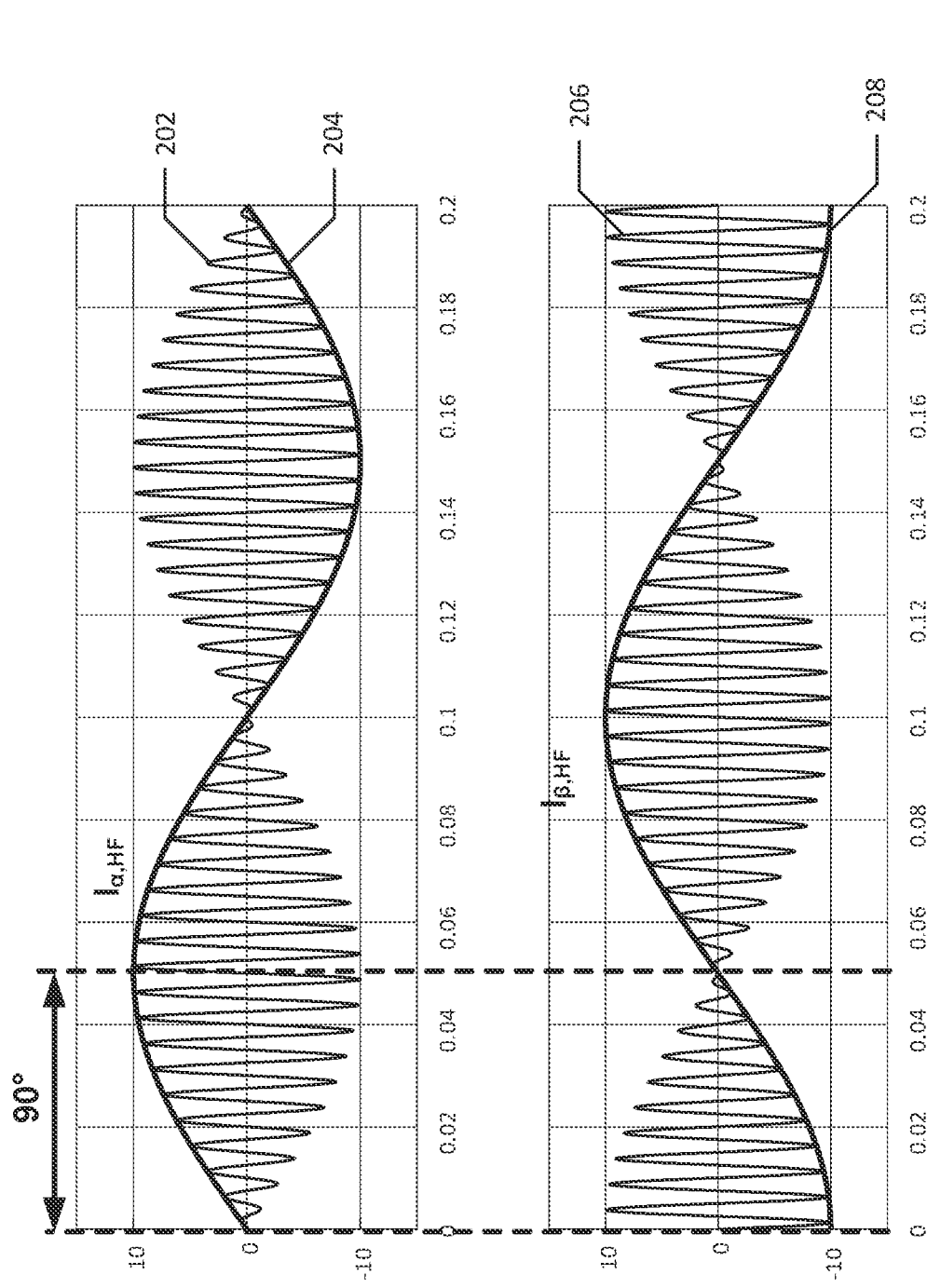
FIG. 2 illustrates example transformed stator current waveforms of an example system for indirectly measuring the angular position and/or rotational speed of an electrical machine having a wound rotor, in accordance with some embodiments of the present disclosure.

Referring now to FIG. 2, example transformed stator current waveforms 200 of an example system for indirectly measuring the angular position and/or rotational speed of an electrical machine having a wound rotor are illustrated. FIG. 1 shows transformed stator currents 202, 206 (also labeled, respectively, $I_{\alpha,HF}$, $I_{\beta,HF}$) that are offset 90 degrees from each other. As seen in FIG. 2, each of the transformed stator currents has an envelope waveform 204, 208 which contains information about rotor position and speed (in various embodiments, the envelope waveforms 204, 208 are not obtained at this point, but are shown in FIG. 2 for explanation purposes).

Figure 3:
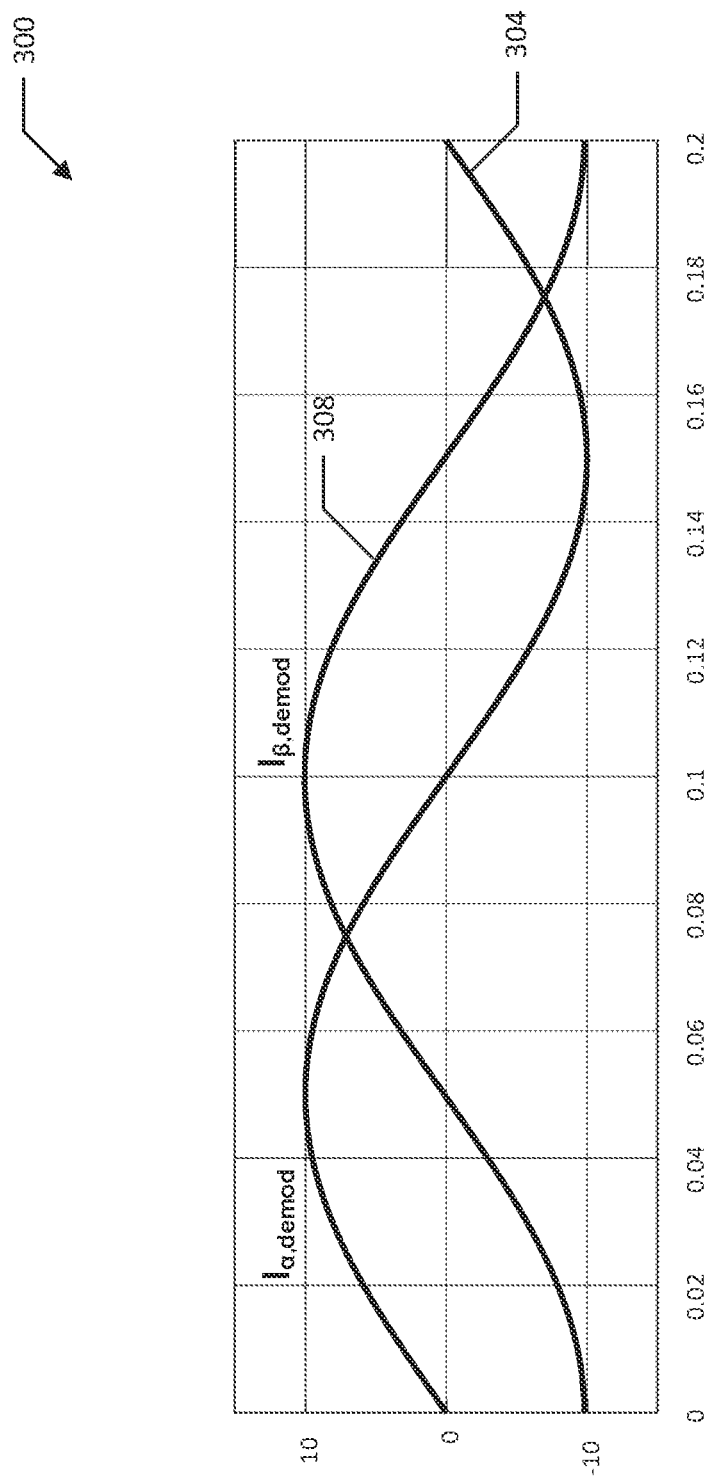
FIG. 3 illustrates example demodulated stator current waveforms of an example system for indirectly measuring the angular position and/or rotational speed of an electrical machine having a wound rotor, in accordance with some embodiments of the present disclosure.

In various embodiments, the two 90° displaced sinusoidal phase currents shown in FIG. 2 are demodulated to extract the envelope waveforms. As discussed above, these envelope waveforms contain information about rotor position and speed. Referring now to FIG. 3, example envelope waveforms 300 of an example system for indirectly measuring the angular position and/or rotational speed of an electrical machine having a wound rotor are illustrated. FIG. 3 shows extracted envelope waveforms 304, 308 (also labeled, respectively, $I_{\alpha,demod}$, $I_{\beta,demod}$) of the transformed stator currents 202, 206 respectively.

In various embodiments, the extracted envelope waveforms shown in FIG. 3 can be used to determine a rotor position and/or speed using an arctangent function, phase locked loops, or other known techniques, in a similar manner as when a resolver is used.

Various embodiments of the present disclosure enable obtaining angular position (phase) information at any motor speed, including zero. As a motor's rotational speed decreases, the frequency of the extracted envelope waveforms will decrease and the wavelength will increase until, at zero speed, the extracted envelope waveforms are substantially horizontal lines from which the motor's angular position may be determined.

In various embodiments of the present disclosure, the process of indirectly measuring the angular position and/or rotational speed of an electrical machine having a wound rotor may be repeated as needed. For example, in various embodiments the process may be repeated for each cycle of the control of the stator currents (that is typically done, for example but not limited to, between every 10 microseconds us up to 1 millisecond.

Figure 4:
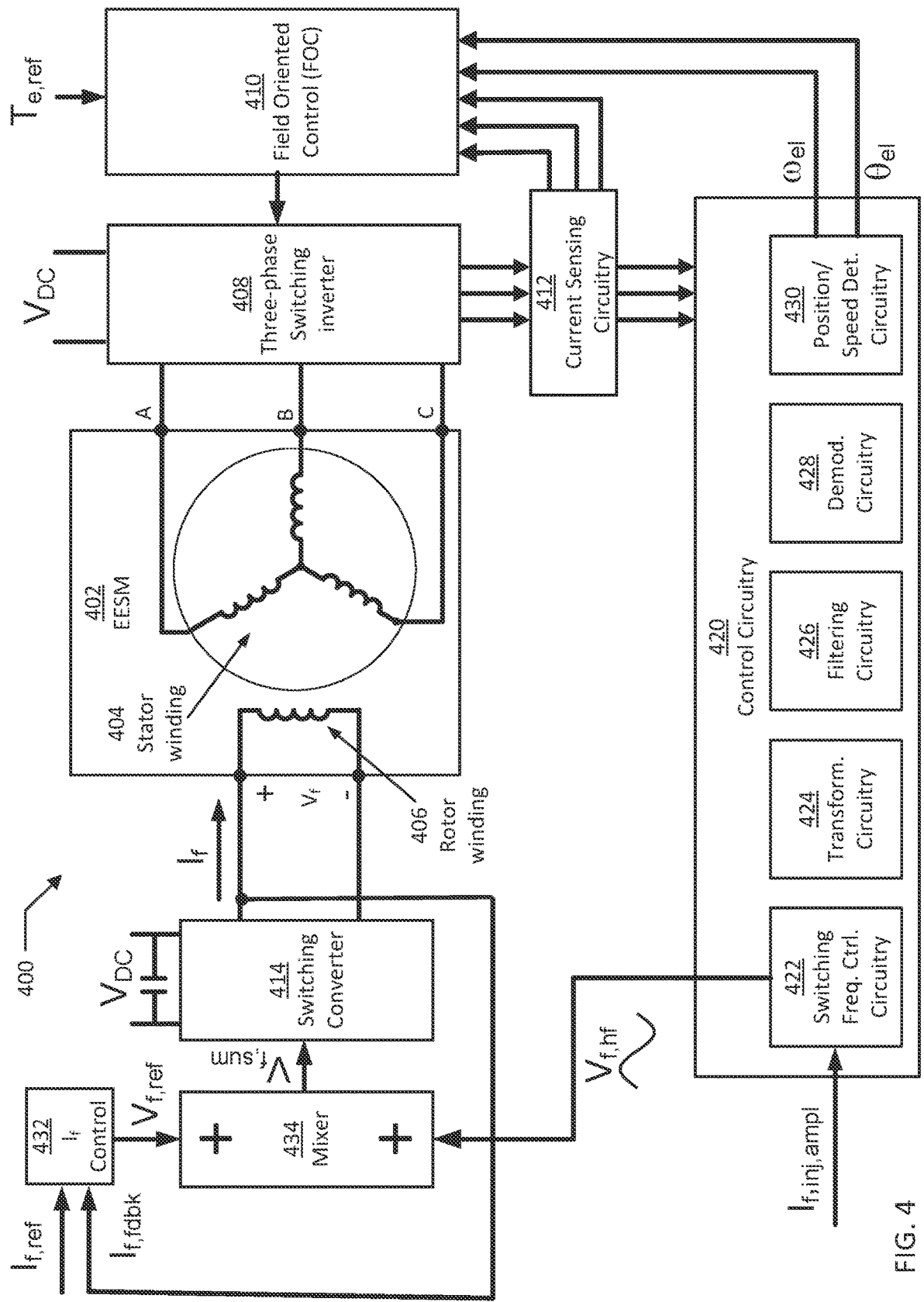
FIG. 4 is an example block diagram illustrating an example system for indirectly measuring the angular position and/or rotational speed of an electrical machine having a wound rotor, in accordance with an example embodiment of the present disclosure.

Referring now to FIG. 4, an example block diagram of an example system 400 for indirectly measuring the angular position and/or rotational speed of an electrical machine having a wound rotor is illustrated, in accordance with an example embodiment of the present disclosure. As seen in FIG. 4, a wound rotor electric motor 402 (for example, an EESM) has a three-phase stator winding 404 and a rotor winding 406. A switching converter 414 has a DC supply voltage ($V_{DC}$) and provides a field current ($I_f$), producing a field voltage ($V_f$) to the rotor winding 406 to induce an electromagnetic field in the rotor winding 406. The rotor is coupled to a motor shaft (not illustrated). A field oriented control (FOC) unit 410 receives a torque command ($T_{e,ref}$) and provides a control output to a three phase switching inverter 408. The torque command may come, for example, in the case of an electric traction motor of an electric vehicle, the torque reference is given directly by the user using the vehicle accelerator. The three phase switching inverter 408 has a DC supply voltage ($V_{DC}$) and applies a time-varying AC current to the stator winding 404 to generate a rotating magnetic field. The rotating magnetic field generated by the stator couples with the magnetic field of the rotor winding 406 and causes the motor shaft to rotate.

A field current ($I_f$) control module 432 receives a field current reference signal ($I_{f,ref}$) indicating what field current should be provided to the switching converter 414 and outputs a corresponding field voltage reference signal ($V_{f,ref}$). In various embodiments, the field current reference signal comes from a separate controller (not illustrated) which adjusts the field current reference as needed depending on the motor speed to produce the desired torque. The field current control module 432 also receives a field current feedback signal ($I_{f,fdbk}$) that is fed back from the output of the switching converter 414 to enable the field current control module 432 to adjust its output if needed to ensure that the switching converter 414 is providing the desired field current to the rotor winding 406. In a conventional wound motor arrangement, the field current reference signal would be provided to the switching converter. In the example system of FIG. 4, the field voltage reference signal is provided to a mixer 434 where the field voltage reference signal is mixed with the signal to be injected (described further below).

In the example system of FIG. 4, control circuitry 420 comprises switching frequency control circuitry 422, transforming circuitry 424, filtering circuitry 426, demodulating circuitry 428, and position/speed determining circuitry 430. The switching frequency control circuitry 422 receives a signal ($I_{f,inj,ampl}$) that indicates the desired frequency and amplitude of the sinusoidal signal to be injected into the rotor winding. In various embodiments, the $I_{f,inj,ampl}$ signal may be a fixed parameter set by a user or can be controlled by a controller (not illustrated) according to the specific conditions and or other measurements. As described above, in some embodiments the frequency of the injected signal may be varied based on the speed of the motor and this will be reflected in indication ($I_{f,inj,ampl}$). Based on the received signal ($I_{f,inj,ampl}$), the switching frequency control circuitry 422 outputs a sinusoidal signal ($V_{f,hf}$) that has the desired frequency and amplitude as indicated in the received signal ($I_{f,inj,ampl}$). The sinusoidal signal ($V_{f,hf}$) is provided to the mixer 434 where sinusoidal signal ($V_{f,hf}$) is mixed with the field voltage reference signal ($V_{f,ref}$). The mixer 434 provides the combined signal ($V_{f,sum}$) to the switching converter 414.

The stator current, which includes the high frequency component injected into the rotor winding, is detected by current sensing circuitry 412. The detected stator current is provided to the FOC unit 410 which uses the detected stator current as feedback for torque control. In the illustrated embodiment, the detected stator current is also provided by the current sensing circuitry 412 to the control circuitry 420.

The filtering circuitry 426 of the control circuitry 420 extracts the high frequency component of the current ($I_{f,ref}$) provided to the rotor winding 406 from the detected stator current for each of the three phases. As described above, FIG. 1 illustrates an example of such extracted high frequency components. In such embodiments in which the frequency of the injected signal is varied based on the speed of the motor, the passband frequency of the filtering circuitry 426 is adjustable.

The filtering circuitry 426 provides the extracted high frequency components to the transforming circuitry 424 which transforms the extracted high frequency components for the three phases into two, 90-degree displaced currents. As described above, FIG. 2 illustrates an example of such transformed stator currents. The transforming circuitry 424 provides the transformed stator currents to the demodulating circuitry 428 which demodulates the two, 90-degree displaced currents to extract the envelope waveforms. As described above, FIG. 3 illustrates an example of such extracted envelope waveforms.

The demodulating circuitry 428 provides the extracted envelope waveforms to the position/speed determining circuitry 430 which uses the extracted envelope waveforms to determine the rotor angle $\theta_r$ and/or rotational speed $\omega_r$ using an arctangent function, phase locked loops, or other known techniques. As is conventionally known, the determined rotational speed $\omega_r$ and the determined rotational angle $\theta_r$ are used to calculate the electrical qualities $\omega_{el}$ and $\theta_{el}$ which are provided to the FOC unit 410 for torque control.

Figure 5:
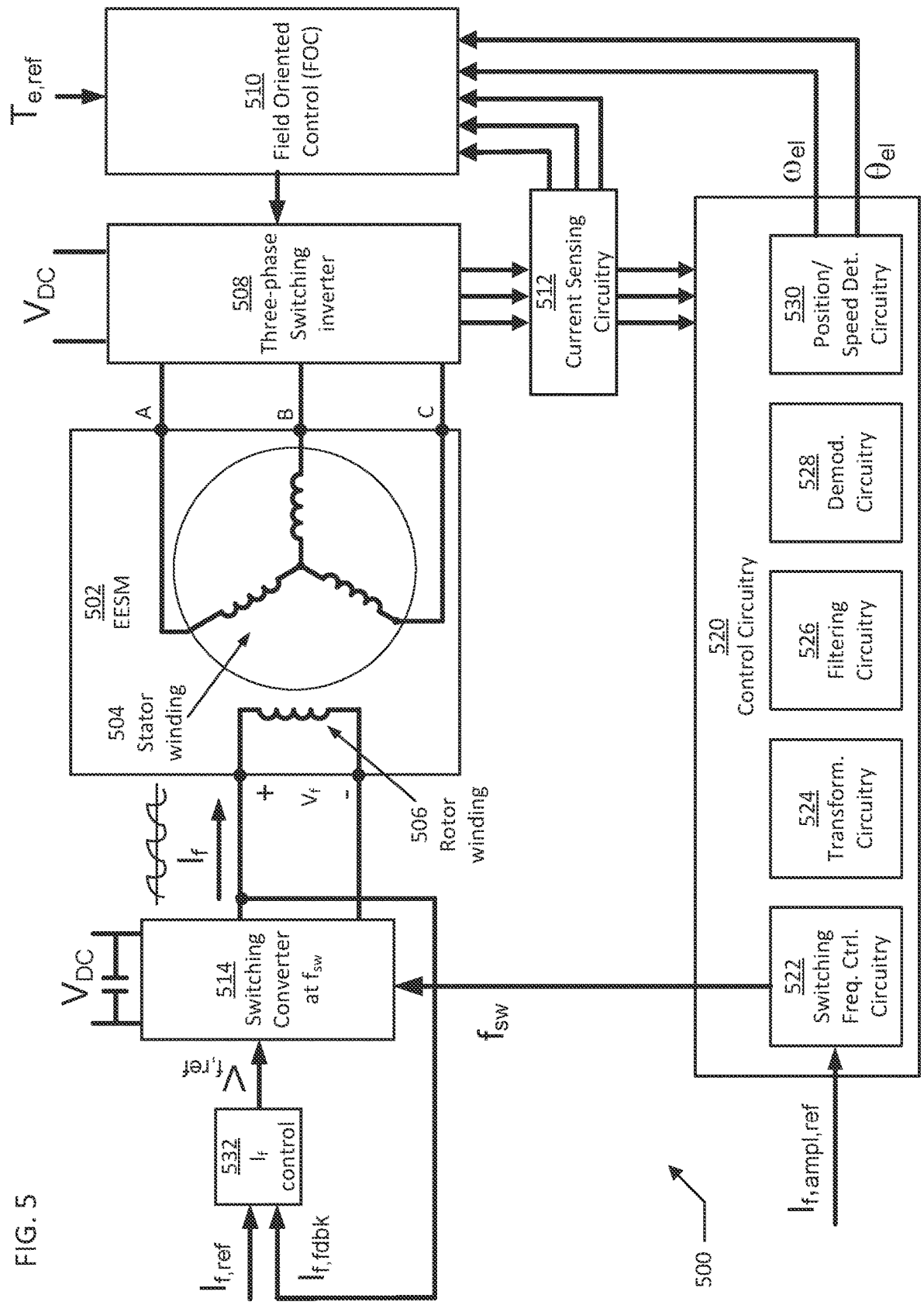
FIG. 5 is an example block diagram illustrating an example system for indirectly measuring the angular position and/or rotational speed of an electrical machine having a wound rotor, in accordance with an alternative example embodiment of the present disclosure.

Referring now to FIG. 5, an example block diagram illustrating an example system 500 for indirectly measuring the angular position and/or rotational speed of an electrical machine having a wound rotor is illustrated in accordance with an alternative example embodiment of the present disclosure. In various alternative embodiments, the system of FIG. 5 uses the field current ripple at the switching frequency of the switching converter 514. These alternative embodiments use the switching converter's switching frequency to generate the proper ripple level, which is high enough to generate the desired effect in the stator without introducing undesired torque ripple. Using this strategy, the injection frequency and the switching frequency are coincident.

As seen in FIG. 5, a wound rotor electric motor 502 (for example, an EESM) has a three-phase stator winding 504 and a rotor winding 506. A switching converter 514 has a DC supply voltage ($V_{DC}$) and provides a field current ($I_f$), producing a field voltage ($V_f$) to the rotor winding 506 to induce an electromagnetic field in the rotor winding 506. The rotor is coupled to a motor shaft (not illustrated). A field oriented control (FOC) unit 510 receives a torque command ($T_{e,ref}$) and provides a control output to a three phase switching inverter 508. The three phase switching inverter 508 has a DC supply voltage ($V_{DC}$) and applies a time-varying AC current to the stator winding 504 to generate a rotating magnetic field. The rotating magnetic field generated by the stator couples with the magnetic field of the rotor winding 506 and causes the motor shaft to rotate.

A field current ($I_f$) control module 532 receives a field current reference signal ($I_{f,ref}$) indicating what field current should be provided to the switching converter 514 and outputs a corresponding field voltage reference signal ($V_{f,ref}$). The field current control module 532 also receives a field current feedback signal ($I_{f,fdbk}$) that is fed back from the output of the switching converter 514 to enable the field current control module 532 to adjust its output if needed to ensure that the switching converter 514 is providing the desired field current to the rotor winding 506. The field voltage reference signal ($V_{f,ref}$ is provided to the switching converter 514.

In the example system of FIG. 5, control circuitry 520 comprises switching frequency control circuitry 522, transforming circuitry 524, filtering circuitry 526, demodulating circuitry 528, and position/speed determining circuitry 530. The switching frequency control circuitry 522 receives a signal ($I_{f,ampl,ref}$) that indicates the desired frequency and amplitude of the sinusoidal signal to be injected into the rotor winding. In various embodiments, the signal $I_{f,ampl,ref}$ may be a fixed parameter set by a user or can be controlled by a controller (not illustrated) according to the specific conditions and or other measurements. As described above, in some embodiments the frequency of the injected signal may be varied based on the speed of the motor and this will be reflected in indication ($I_{f,ampl,ref}$). Based on the received signal ($I_{f,ampl,ref}$), the switching frequency control circuitry 522 outputs a signal ($f_{SW}$) to the switching converter 514 to indicate the desired switching frequency that will cause the desired ripple current in the field current ($I_{f,ref}$). In various embodiments, the ripple current in the field current ($I_{f,ref}$) can have a "shark tooth" shape or a "saw tooth" shape, as illustrated in the waveform above the field current ($I_{f,ref}$) in FIG. 5.

The stator current, which includes the high frequency component injected into the rotor winding, is detected by current sensing circuitry 512. The detected stator current is provided to the FOC unit 510 which uses the detected stator current as feedback for torque control. In the illustrated embodiment, the detected stator current is also provided by the current sensing circuitry 512 to the control circuitry 520.

The filtering circuitry 526 of the control circuitry 520 extracts the high frequency component of the current ($I_{f,ref}$) provided to the rotor winding 506 from the detected stator current for each of the three phases. In such embodiments in which the frequency of the injected signal is varied based on the speed of the motor, the passband frequency of the filtering circuitry 526 is adjustable.

The filtering circuitry 526 provides the extracted high frequency components to the transforming circuitry 524 which transforms the extracted high frequency components for the three phases into two, 90-degree displaced currents. The transforming circuitry 524 provides the transformed stator currents to the demodulating circuitry 528 which demodulates the two, 90-degree displaced currents to extract the envelope waveforms.

The demodulating circuitry 528 provides the extracted envelope waveforms to the position/speed determining circuitry 530 which uses the extracted envelope waveforms to determine a rotor angle $\theta_r$ and/or rotational speed or using an arctangent function, phase locked loops, or other known techniques. As is conventionally known, the determined rotational speed $\omega_r$ and the determined rotational angle $\theta_r$ are used to calculate the electrical qualities $\omega_{el}$ and $\theta_{el}$ which are provided to the FOC unit 510 for torque control.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitries both leverage use of the same processor(s), memory(ies), circuitry(ies), and/or the like to perform their associated functions such that duplicate hardware is not required for each set of circuitry.

Reference will now be made to FIG. 6, which provides a flowchart illustrating example steps, processes, procedures, and/or operations in accordance with various embodiments of the present disclosure. Various methods described herein, including, for example, example methods as shown in FIG. 6, may provide various technical benefits and improvements. It is noted that each block of the flowchart, and combinations of blocks in the flowchart, may be implemented by various means such as hardware, firmware, circuitry and/or other devices associated with execution of software including one or more computer program instructions. For example, one or more of the procedures described in FIG. 6 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Having described example systems, apparatuses, computing environments, and user interfaces associated with embodiments of the present disclosure, example flowcharts including various operations performed by the circuits, apparatuses, systems, and/or devices described herein will now be discussed. It should be appreciated that each of the flowcharts depicts an example process that may be performed by one or more of the circuits, apparatuses, systems, and/or devices described herein, for example utilizing one or more of the components thereof. The blocks indicating operations of each process may be arranged in any of a number of ways, as depicted and described herein. In some such embodiments, one or more blocks of any of the processes described herein occur concurrently rather than sequentially. In some such embodiments, one or more blocks of any of the processes described herein occur in-between one or more blocks of another process, before one or more blocks of another process, and/or otherwise operates as a sub-process of a second process. Additionally or alternative, any of the processes may include some or all of the steps described and/or depicted, including one or more optional operational blocks in some embodiments. In regards to the below flowchart(s), one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, re-ordered, and/or otherwise altered as described herein.

Referring now to FIG. 6, an example flow diagram illustrating an example method 600 for indirectly measuring the angular position and/or rotational speed of an electrical machine having a wound rotor in accordance with some embodiments of the present disclosure is illustrated. In some embodiments, the example method 600 may be implemented by an example system described herein, including, but not limited to, the example system 400 described above in connection with FIG. 4 and/or the example system 500 described above in connection with FIG. 5.

In the example method shown in FIG. 6, the example method 600 starts at step/operation 602. At step/operation 604, one or more components of a system (such as, but not limited to, the switching converter 414, in conjunction with the switching frequency control circuitry 422 of the control circuitry 420 and the mixer 434 described above in connection with FIG. 4) provides a current to the wound rotor that has a component detectable in the stator. As described above, in various embodiments a periodic signal may be injected in the rotor winding to introduce a small ripple in the rotor current. Alternatively, in various alternative embodiments the switching frequency may be selected to induce a desired ripple current.

At step/operation 606, one or more components of a system (such as, but not limited to, the current sensing circuitry 412, in conjunction with the control circuitry 420 described above in connection with FIG. 4) detects a stator current for each of the three phases from the stator winding 404 of the EESM 402.

At step/operation 608, one or more components of a system (such as, but not limited to, the filtering circuitry 426 of the control circuitry 420 described above in connection with FIG. 4) extracts the high frequency component of the current provided to the wound rotor from the detected stator current for each of the three phases. As described above, FIG. 1 illustrates an example of such extracted high frequency components.

At step/operation 610, one or more components of a system (such as, but not limited to, the transforming circuitry 424 of the control circuitry 420 described above in connection with FIG. 4) transforms the extracted high frequency components for the three phases into two, 90-degree displaced currents. As described above, FIG. 2 illustrates an example of such transformed stator currents.

At step/operation 612, one or more components of a system (such as, but not limited to, the demodulating circuitry 428 of the control circuitry 420 described above in connection with FIG. 4) demodulates the two, 90-degree displaced currents to extract the envelope waveforms. As described above, FIG. 3 illustrates an example of such extracted envelope waveforms.

At step/operation 614, one or more components of a system (such as, but not limited to, the position/speed determining circuitry 430 of the control circuitry 420 described above in connection with FIG. 4) use the extracted envelope waveforms to determine a rotor position and/or speed using an arctangent function, phase locked loops, or other known techniques.

In some embodiments, the example method shown in FIG. 6 continuously repeats.

Some or all of the functionality described herein may be implemented as part of an integrated circuit (IC) to perform, for example, one or more functions described herein.

The processing elements described herein, such as the control circuitry, may include one or more processors, input/output circuitry, data storage media, communications circuitry, and/or other components configured to perform compute operations. In some embodiments, the data storage media may be configured to store information, data, content, applications, instructions, or the like, for enabling the processing elements described herein to carry out various functions. As such, in some embodiments, the processing elements described herein may be referred to as functional logic. The processing elements described herein may be embodied in a number of different ways, for example, in some embodiments, the processing elements described herein may include one or more processing devices configured to perform independently. Additionally or alternatively, in some embodiments, the processing elements described herein may include one or more processor(s) configured in tandem via a bus to enable independent execution of instructions, pipelining, and/or multithreading. The use of the terms "controller," "processor," "control circuitry," and "processing circuitry" should be understood to include a single core processor, a multi-core processor, multiple processors internal to the processing elements described herein, and/or one or more remote or "cloud" processor(s) external to the processing elements described herein.

In an example embodiment, the processing elements described herein may be configured to execute instructions stored in the data storage media or otherwise accessible to the processor. Alternatively or additionally, the processing elements described herein in some embodiments is configured to execute hard-coded functionality. As such, whether configured by hardware or software methods, or by a combination thereof, the processing elements described herein represent an entity (e.g., physically embodied in circuitry) capable of performing operations according to an embodiment of the present disclosure while configured accordingly. Alternatively or additionally, as another example in some example embodiments, when the processing elements described herein is embodied as an executor of software instructions, the instructions specifically configure the processing elements described herein to perform the algorithms embodied in the specific operations described herein when such instructions are executed.

The use of the term "circuitry" as used herein with respect to components of the apparatus should therefore be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, storage media, network interfaces, input/output devices, and the like.

CONCLUSION

Many modifications and other embodiments of the disclosures set forth herein will come to mind to one skilled in the art to which these disclosures pertain having the benefit of teachings presented in the foregoing descriptions and the associated drawings. Although the figures only show certain components of the apparatus and systems described herein, it is understood that various other components may be used in conjunction with the system. Therefore, it is to be understood that the disclosures are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the disclosure(s) set out in any claims that may issue from this disclosure.

While this detailed description has set forth some embodiments of the present disclosure, the appended claims cover other embodiments of the present disclosure which differ from the described embodiments according to various modifications and improvements. For example, the appended claims can cover any form of system, device, integrated circuit, or method which for estimates the angular position and/or rotational speed of three phase or multiphase electric motors that have wound rotors by injecting a signal in the rotor winding to introduce a small ripple in the field current that can be extracted from the stator currents and analyzed.

Within the appended claims, unless the specific term "means for" or "step for" is used within a given claim, it is not intended that the claim be interpreted under 35 U.S.C. 112, paragraph 6.

What is claimed is:

1. A system for indirectly measuring an angular position and/or a rotational speed of an electrical machine having a rotatable shaft, a wound rotor, and a stator having three or more phases, the, the system comprising:
   a switching converter adapted to provide a current to the wound rotor, the current having a component detectable in the stator;
   current sensing circuitry adapted to detect a stator current for each of the three or more phases;
   filtering circuitry adapted to extract the detectable component of the current provided to the wound rotor from the detected stator current for each of the three or more phases; and
   control circuitry for (i) transforming the extracted detectable component of the current provided to the wound rotor from the detected stator current for each of the three or more phases into two, 90 degree displaced currents, (ii) demodulating the two, 90 degree displaced currents to obtain an envelope waveform for each of the two, 90 degree displaced currents, and (iii) analyzing the envelope waveforms for the two, 90 degree displaced currents to determine an angular position and/or a rotational speed of the rotatable shaft.

2. The system of claim 1, wherein the detectable component of the current provided to the wound rotor comprises a ripple current of a switching current provided to the wound rotor.

3. The system of claim 1, wherein the detectable component of the current provided to the wound rotor comprises a sinusoidal signal having a lower frequency than a switching current provided to the wound rotor.

4. The system of claim 1, wherein the detectable component of the current provided to the wound rotor has a frequency that is adjustable and correlated to the rotational speed of the rotatable shaft.

5. The system of claim 4, wherein the filtering circuitry is adjustable to enable extraction of the detectable component of the current provided to the wound rotor having an adjustable frequency.

6. The system of claim 4, wherein the frequency of the detectable component of the current provided to the wound rotor is at least four times a frequency of the envelope waveforms for the two, 90 degree displaced currents.

7. The system of claim 1, wherein the control circuitry transforms the extracted detectable component of the current provided to the wound rotor from the detected stator current for each of the three or more phases into two, 90 degree displaced currents using a Clarke transformation.

8. The system of claim 1, wherein the control circuitry analyzes the envelope waveforms for the two, 90 degree displaced currents to determine an angle and/or rotational speed of the rotatable shaft using a phase locked loop or an arctangent function.

9. The system of claim 1, wherein the electrical machine comprises a motor, a generator, or an alternator.

10. The system of claim 1, wherein the electrical machine comprises an electrically excited synchronous motor.

11. A method for indirectly measuring an angular position and/or a rotational speed of an electrical machine having a rotatable shaft, a wound rotor, and a stator having three or more phases, the method comprising:
    providing a current to the wound rotor, the current having a component detectable in the stator;
    detecting a stator current for each of the three or more phases;
    extracting the detectable component of the current provided to the wound rotor from the detected stator current for each of the three or more phases;
    transforming the extracted detectable component of the current provided to the wound rotor from the detected stator current for each of the three or more phases into two, 90 degree displaced currents;
    demodulating the two, 90 degree displaced currents to obtain an envelope waveform for each of the two, 90 degree displaced currents; and
    analyzing the envelope waveforms for the two, 90 degree displaced currents to determine an angular position and/or a rotational speed of the rotatable shaft.

12. The method of claim 11, wherein the detectable component of the current provided to the wound rotor comprises a ripple current of a switching current provided to the wound rotor.

13. The method of claim 11, wherein the detectable component of the current provided to the wound rotor comprises a sinusoidal signal having a lower frequency than a switching current provided to the wound rotor.

14. The method of claim 11, wherein the detectable component of the current provided to the wound rotor has a frequency that is adjustable and correlated to the rotational speed of the rotatable shaft.

15. The method of claim 14, wherein the frequency of the detectable component of the current provided to the wound rotor is at least four times a frequency of the envelope waveforms for the two, 90 degree displaced currents.

16. The method of claim 11, wherein the extracted detectable component of the current provided to the wound rotor from the detected stator current for each of the three or more phases is transformed into two, 90 degree displaced currents using a Clarke transformation.

17. The method of claim 11, wherein the envelope waveforms for the two, 90 degree displaced currents are analyzed to determine an angle and/or rotational speed of the rotatable shaft using a phase locked loop or an arctangent function.

18. The method of claim 11, wherein the electrical machine comprises a motor, a generator, or an alternator.

19. The method of claim 11, wherein the electrical machine comprises an electrically excited synchronous motor.

* * * * *